United States Patent
Richardson, Jr.

(10) Patent No.: US 7,970,831 B2
(45) Date of Patent: Jun. 28, 2011

(54) INTELLIGENT EMAIL SERVICES

(75) Inventor: James T. Richardson, Jr., Madison, AL (US)

(73) Assignee: The Boeing Company, Chicago, IL (US)

( * ) Notice: Subject to any disclaimer, the term of this patent is extended or adjusted under 35 U.S.C. 154(b) by 1426 days.

(21) Appl. No.: 10/771,052

(22) Filed: Feb. 2, 2004

(65) Prior Publication Data
US 2005/0172003 A1 Aug. 4, 2005

(51) Int. Cl.
*G06F 15/16* (2006.01)

(52) U.S. Cl. ......... 709/206; 709/225; 709/226; 709/229

(58) Field of Classification Search ................ 709/225, 709/226, 229
See application file for complete search history.

(56) References Cited

U.S. PATENT DOCUMENTS

| | | | |
|---|---|---|---|
| 6,138,122 A * | 10/2000 | Smith et al. ............... 707/103 R |
| 6,249,807 B1 * | 6/2001 | Shaw et al. ............... 709/206 |
| 6,532,489 B1 * | 3/2003 | Merchant ............... 709/206 |
| 6,658,454 B1 * | 12/2003 | Delany et al. ............... 709/202 |
| 6,836,895 B2 * | 12/2004 | Hamlin ............... 719/328 |
| 6,941,348 B2 * | 9/2005 | Petry et al. ............... 709/206 |
| 6,959,324 B1 * | 10/2005 | Kubik et al. ............... 709/206 |
| 7,093,025 B1 * | 8/2006 | Gupta ............... 709/239 |
| 7,272,662 B2 * | 9/2007 | Chesnais et al. ............... 709/246 |
| 2003/0158905 A1 | 8/2003 | Petry et al. |
| 2004/0236999 A1 * | 11/2004 | Bezuidenhout ............... 714/38 |
| 2005/0055399 A1 * | 3/2005 | Savchuk ............... 709/203 |
| 2006/0224750 A1 * | 10/2006 | Davies et al. ............... 709/229 |

OTHER PUBLICATIONS

ColdFusion, Web Application Server, 4th Generation, pp. 1-28, Allaire Corp., 1995-1999.*

* cited by examiner

*Primary Examiner* — Rupal D Dharia
*Assistant Examiner* — Van Kim T Nguyen
(74) *Attorney, Agent, or Firm* — Haynes & Boone, LLP.

(57) ABSTRACT

An intelligent email service for a web-based intranet server such as a ColdFusion server that automatically generates emails is provided. The intelligent email service provides a periodic verification of normal email spooler activity. Should the spooler be malfunctioning, the intelligent email service restarts the spooler and notifies the server's system administrator. The intelligent email service also processes any undeliverable email messages by determining, for each undeliverable email, whether mail server or the email itself was at fault. Should the mail server be at fault, the undelivered email is resent. Otherwise, the faulty email is emailed back to the originating party.

7 Claims, 4 Drawing Sheets

INTELLIGENT EMAIL SERVICES

STATEMENT REGARDING FEDERALLY SPONSORED RESEARCH OR DEVELOPMENT

This invention was made with Government support under contract number HQ0006-01-C-0001 awarded by the U.S. Missile Defense Agency. The Government has certain rights in this invention.

TECHNICAL FIELD

This invention relates generally to electronic mail (email), and more particularly to a method of email management for outgoing email between a client server and an SMTP server.

BACKGROUND

Organizations such as corporations typically network their computers and related devices in a secure network, protected by a firewall from outside Internet users. A particular form of secure network known as a web-based intranet has become quite popular because it shares the well-known TCP/IP protocol used on the Internet. Because it shares the TCP/IP protocol, a user on an intranet may access intranet webpages through an intranet web server in the familiar Internet web-surfing hypertext-linked fashion.

By virtue of being web-based, web pages in web-based intranets may be enhanced using quite a number of powerful web development software tools. For example, ColdFusion™ or ColdFusionMX™ permits an intranet's database to be queried and updated through the intranet's web server (for discussion clarity, both development tools will be referred to as "ColdFusion"). Using ColdFusion, an intranet's web pages can be written using the ColdFusion Markup Language (CFML) tags and display a variety of data.

Regardless of the website development tool installed within a particular intranet web server, users may desire that certain actions automatically generate emails to others within or outside the intranet. In general, although website development tools may provide email capabilities, these capabilities tend to be rather rudimentary, given that a typical email will be handled by a user's normal email program such as Outlook or Eudora. For example, ColdFusion provides support for sending an SMTP (Simple Mail Transfer Protocol) email from a ColdFusion-enabled web server. To send email, a ColdFusion-enabled intranet web server will require access to an SMTP mail server. To allow the ColdFusion application to continue running while the email is sent, ColdFusion includes an email spooler. Should the email be returned to the ColdFusion-enabled web server due to any errors, it is placed in a folder for undeliverable emails.

Although ColdFusion provides an email capability, a number of problems arise during use of this capability. For example, as users move from the intranet or change email addresses, the likelihood of undeliverable email increases. Should problems arise with the spooler or the SMTP mail server go down, emails will accumulate and not be delivered. A system administrator has no way of knowing whether there is undeliverable emails or why the email is going undeliverable without checking the undeliverable folder and the spooler operation. Because these operations must be initiated by the system administrator, the maintenance of the email system becomes burdensome and time consuming. Alternatively, the maintenance is simply ignored such that undeliverable emails accumulate indefinitely, without the sender having noticed that the email was not delivered. These same problems will arise with other web development tools providing a rudimentary email capability.

Accordingly, there is a need in the art for intelligent email services for web development tools that automatically generate emails using a rudimentary email capability.

SUMMARY

In accordance with one aspect of the invention, an email method is provided for an intranet web server that automatically generates email from an intranet user and queues the automatically-generated email in an email spooler from where the automatically-generated email is sent to a mail server for delivery to the intended recipients, and wherein automatically-generated email that was undeliverable to the intended recipients is returned to the intranet web server. The email method includes the acts of: (a) fetching an email address for the intranet web server's system administrator; (b) verifying normal operation of the email spooler; (c) emailing the system administrator regarding the abnormal operation if act (b) verifies that the email spooler is not operating normally; (d) processing each undeliverable email to determine whether it was returned because of a problem with the email itself or because of a problem with the mail server; (e) resending the undeliverable email to the intended recipient if act (d) determines that an undeliverable email was returned because of a problem with the mail server; and (f) sending the undeliverable email to the originating intranet user if act (d) determines that an undeliverable email was returned because of a problem with the undeliverable email itself.

In accordance with another aspect of the invention, a machine readable medium is provided having stored thereon data representing instructions for an intranet's web server, wherein the intranet web server automatically generates email from an intranet user and queues the automatically-generated email in an email spooler from where the automatically-generated email is sent to a mail server for delivery to the intended recipients, and wherein automatically-generated email that was undeliverable to the intended recipients is returned to the intranet web server. The instructions adapt the web server to perform an email method comprising: (a) fetching an email address for the intranet web server's system administrator; (b) verifying normal operation of the email spooler; (c) emailing the system administrator regarding the abnormal operation if act (b) verifies that the email spooler is not operating normally; (d) processing each undeliverable email to determine whether it was returned because of a problem with the email itself or because of a problem with the mail server; (e) resending the undeliverable email to the intended recipient if act (d) determines that an undeliverable email was returned because of a problem with the mail server; and (f) sending the undeliverable email to the originating intranet user if act (d) determines that an undeliverable email was returned because of a problem with the undeliverable email itself.

In accordance with another aspect of the invention, a system is provided. The system includes a ColdFusion intranet web server configured to automatically generate email from an intranet user and queue the automatically-generated email in a ColdFusion email spooler from where the automatically-generated email is sent to an SMTP mail server for delivery to an intended recipient, and wherein automatically-generated email that was undeliverable to an intended recipient is returned to the ColdFusion server, the ColdFusion server being further configured to perform a method comprising the acts of: (a) verifying that the SMTP mail server is on-line; if the SMTP mail server is on-line: (b) fetching an email address from a relational database for the ColdFusion server's system administrator; (c) verifying normal operation of the ColdFusion email spooler; (d) emailing the system administrator regarding the abnormal operation if act (c) verifies that the ColdFusion email spooler is not operating normally; (e) processing each undeliverable email to determine whether it was returned because of a problem with the email itself or because of a problem with the SMTP mail server; (f) resending the undeliverable email to the intended recipient if act (e) determines that an undeliverable email was returned because of a problem with the SMTP mail server; and (g) sending the undeliverable email to the originating intranet user if act (e) determines that an undeliverable email was returned because of a problem with the undeliverable email itself.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
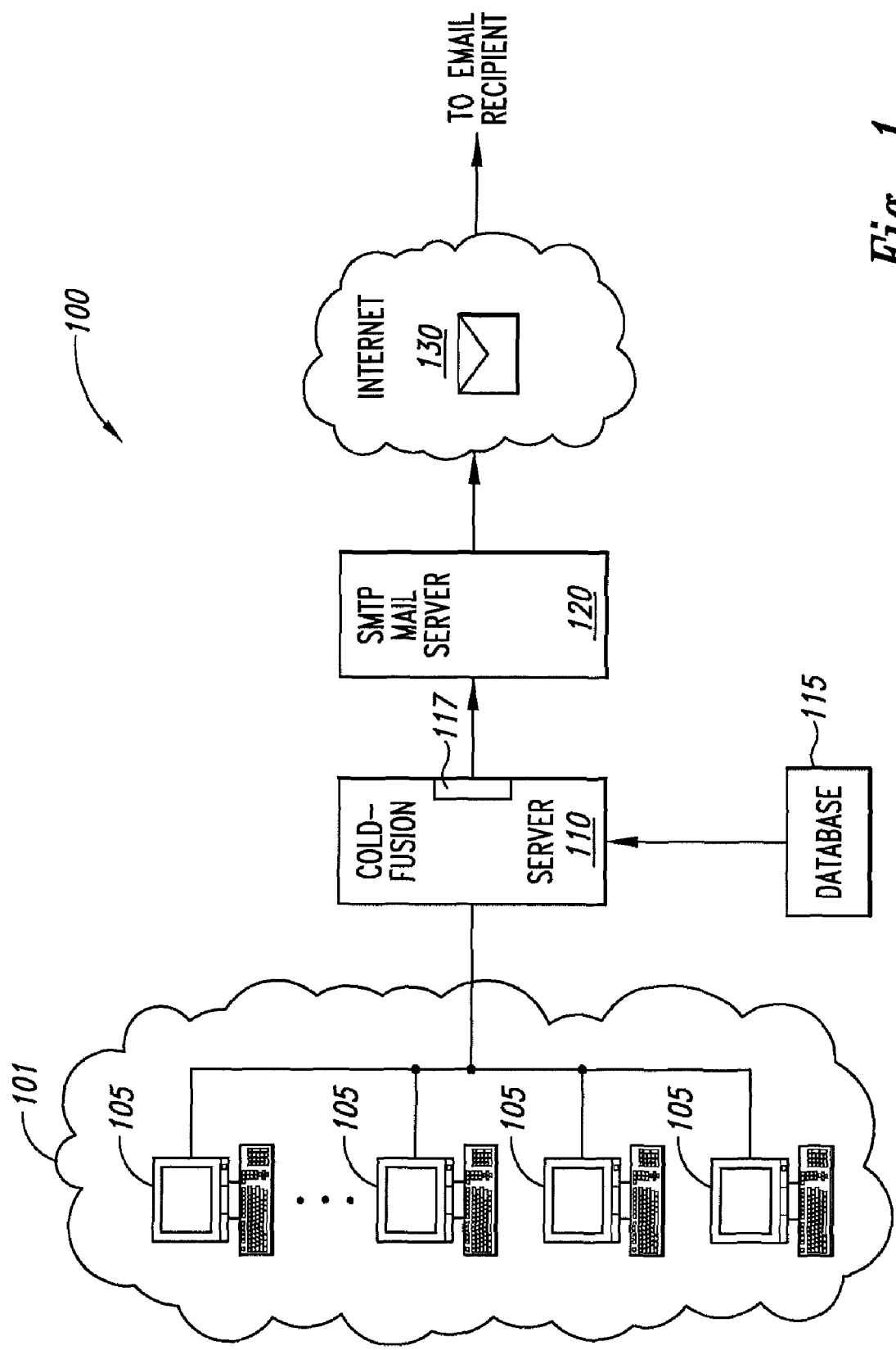
FIG. 1 is a block diagram illustrating how client users of a ColdFusion server send email via an SMTP mail server and the Internet according to one embodiment of the invention.

Referring now to the drawings, FIG. 1 is a block diagram for an exemplary embodiment of the intelligent email service disclosed herein. In this embodiment, the web development tool being enhanced is ColdFusion, but it will be appreciated that the present invention is widely applicable to other web development platforms having a rudimentary email capability. A plurality of users 105 within an intranet 101 can access intranet webpages and other intranet information through a ColdFusion-enabled server 110. Should a user 105 perform a function that server 110 recognizes as initiating an automated email notification, server 110 will access the desired list of email recipients using a database 115, which may be an Oracle relational database or other suitable database. Server 110 generates the emails and queues them within a ColdFusion email spooler 117. From spooler 117, the emails are sent to an SMTP mail server 120, from where they will be routed to Internet 130 before being delivered to the intended recipients.

As described previously, a system administrator 106 of ColdFusion server 110 would typically have to check an undeliverable folder (not illustrated) should these automated notification emails be undeliverable to their intended recipients due to errors. In addition, system administrator 106 would periodically verify operation of email spooler 117. In the present invention, system administrator 106 is freed from these cumbersome tasks because ColdFusion server 110 is programmed with a ColdFusion Markup Language (CFML) tag enabling intelligent email service such that email operation is maintained, verified, and email sender 105 (herein designated as an "Originator") and system administrator 106 are notified of any problems.

Figure 2:
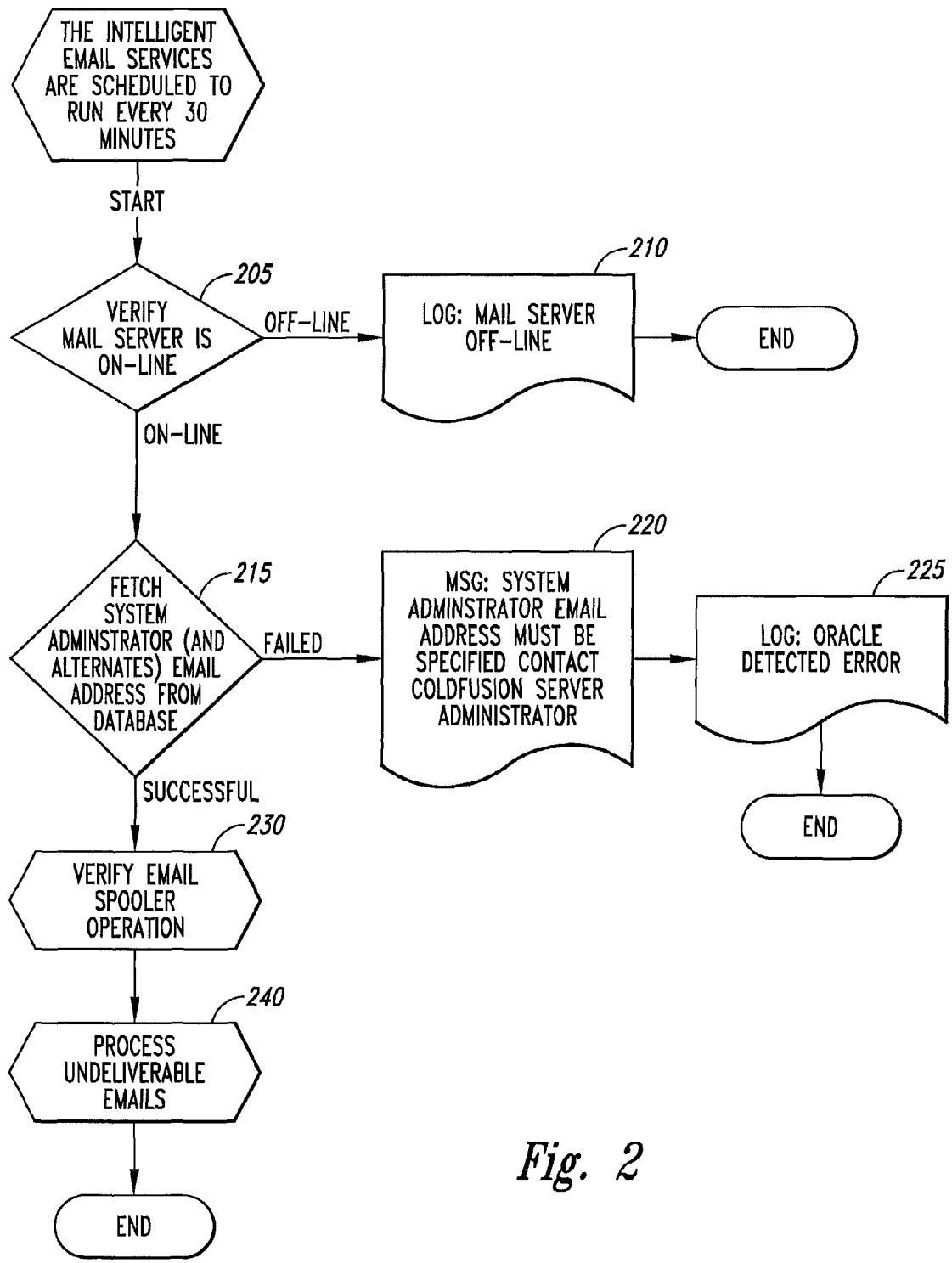
FIG. 2 is a high-level flowchart for an intelligent email service for the ColdFusion server of FIG. 1 in accordance with another embodiment of the invention.

A high-level flowchart for an exemplary embodiment of the intelligent email service disclosed herein is shown in FIG. 2. The intelligent email service may be scheduled for periodic execution on server 110 over a range of intervals. The intervals between execution should be selected such that normal operation of spooler 117 may be completed between execution times. For example, if spooler 117 is expected to take up to two minutes to empty should it be filled with emails, the interval between execution of the intelligent email service should be longer than two minutes—for example, 30 minutes. Upon execution, the on-line status of mail server 120 is examined in step 205. Should mail server 120 be off-line, this status is logged in step 210. At this point, because no email notification to system administrator 106 or the Originator is possible, the operation of the intelligent email service on server 110 may simply be ended (for discussion clarity, the operation of the intelligent mail service on server 110 will simply be referred to as operation of the intelligent mail service). After the execution interval has elapsed, the intelligent email service may again check whether mail server 120 is on-line in step 205.

Should mail server 120 be on-line, the intelligent mail service may fetch the email address of system administrator 106 from database 115 in step 215. Should the intelligent email service be unable to retrieve this email address, this problem is logged in step 220 and a database error logged in step 225. Because the intelligent email service cannot then email system administrator 106, the service is ended until the next execution cycle. However, should an email address for system administrator 106 be available, normal operation may proceed in step 230, wherein the normal operation of email spooler 117 is verified. At step 240, intelligent email service processes the undeliverable emails.

Figure 3:
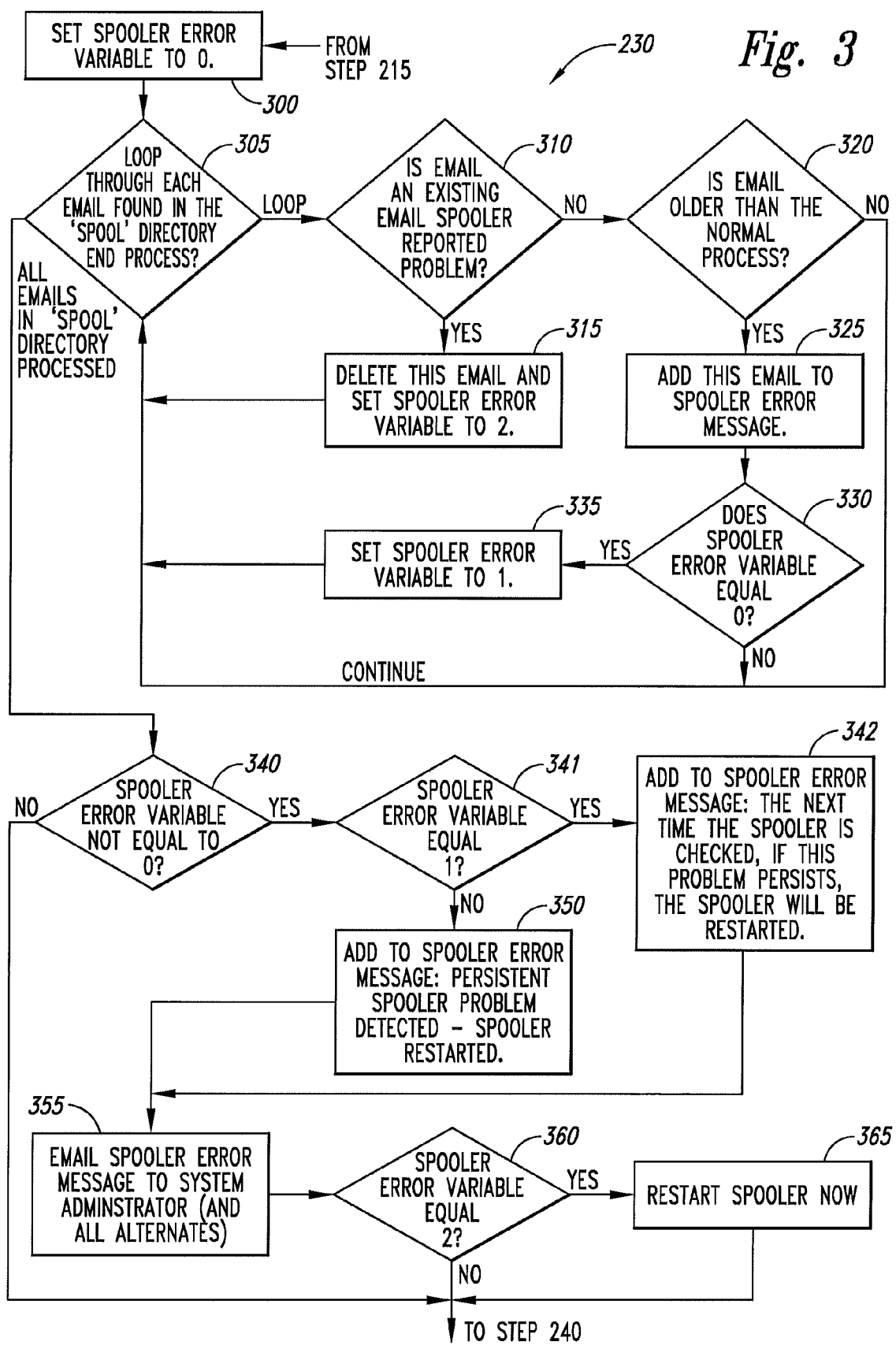
FIG. 3 is a flowchart for the email spooler verification act shown in FIG. 2.

The verification of normal operation of email spooler 117 in step 230 may be further described with respect to the exemplary flow chart shown in FIG. 3. As described above, should email spooler 117 be operating normally, it would be expected to process all the emails within its queue within a normal pendency period such as, for example, two minutes. If an email has been on email spooler 117 longer than this normal pendency period, a spooler problem may be assumed. However, because there could be instances such as an unusually large number (or large size) of emails being placed on email spooler 117 wherein the normal pendency period for emptying email spooler 117 is exceeded despite normal operation, email spooler 117 is not restarted the first time an email is noted as exceeding the normal pendency period. Instead, an error message regarding a potential spooler problem with respect to this email is logged. Note that each email on email spooler 117 may have this pendency problem and an associated error message being logged. After processing all the emails on email spooler 117, the resulting error messages may be emailed to system administrator 106. But should this error message email remain on email spooler 117 in the subsequent execution of step 230, a persistent spooler problem is verified such that email spooler 117 is restarted.

To indicate the various possibilities of: 1) normal spooler operation; 2) an email exceeding the normal pendency period for the first time; and 3) detecting an error message email indicating that the normal pendency period has previously been exceeded for one or more emails so as to indicate a persistent spooler error, a spooler error variable may be updated accordingly. Normal operation will be indicated by the spooler error variable equaling 0, a first time violation of the normal pendency period by the spooler error variable equaling 1, and a persistent spooler error by the spooler error variable equaling 2. Those of ordinary skill will appreciate that the appropriate values for the spooler error variable may be varied. Moreover, multiple spooler error variables may be used to indicate the various error possibilities.

In an initial step 300, the error spooler variable is reset by setting it equal to zero. Each email remaining on email spooler 117 is then processed sequentially. At step 305, the intelligent email service determines whether any unprocessed emails remain in email spooler 117. Should email spooler 117 contain unprocessed emails, the first remaining unprocessed email is examined in step 310 to determine whether it an error message email as discussed above. Should it be the error message email, it is deleted from email spooler 117 and the spooler error variable set to 2 to denote a persistent spooler error in step 315. The spooler verification operation then continues at step 305.

Referring back to step 310, if the email being processed is not the error message email indicating that the normal pendency period has been exceeded for one or more emails, the pendency of the email being processed from email spooler 117 is determined in step 320. Should the email's pendency not exceed the normal pendency period, the verification of email spooler 117 continues at step 305. Should the email's pendency exceed the normal pendency period, a spooler error message regarding this email is logged at step 325. Then the status of the spooler error variable is checked at step 330. Should the spooler error variable not equal zero (indicating abnormal operation), the spooler verification process resumes at step 305. Should the spooler error variable equal zero (indicating normal operation), it is changed to equal one (indicating that an email has exceeded the normal pendency on email spooler 117) at step 335. The spooler verification process may then resume at step 305.

After all emails in email spooler 117 have been processed, the status of the spooler error variable is checked at step 340. Should the spooler error variable remain equal to zero, normal operation of email spooler 117 may be assumed and the spooler verification process ended. Otherwise, whether the spooler error variable equals 1 (indicating that one or more emails have exceeded the normal pendency period) is determined in step 341. If yes, the spooler error message created in step 325 is appended in step 342 with a message indicating that if this problem persists the next time step 230 is executed, a persistent spooler problem will be established. Should the determination in step 341 indicate that the spooler error variable is not equal to one, then it must equal two (indicating a persistent spooler problem). Thus, in step 350, the error message created in step 325 is appended with the statement that a persistent spooler problem has been detected such that email spooler 117 will be restarted. Regardless of whether the spooler error message equals 1 or 2, the resulting spooler error message is then emailed to system administrator 106 and to any alternate system administrators in step 355. Whether the spooler error message equals 2 is again checked in step 360. If not, the spooler verification process may end. If the spooler error message does equal 2, email spooler 117 is restarted in step 365, whereupon the spooler verification process may end.

Figure 4:
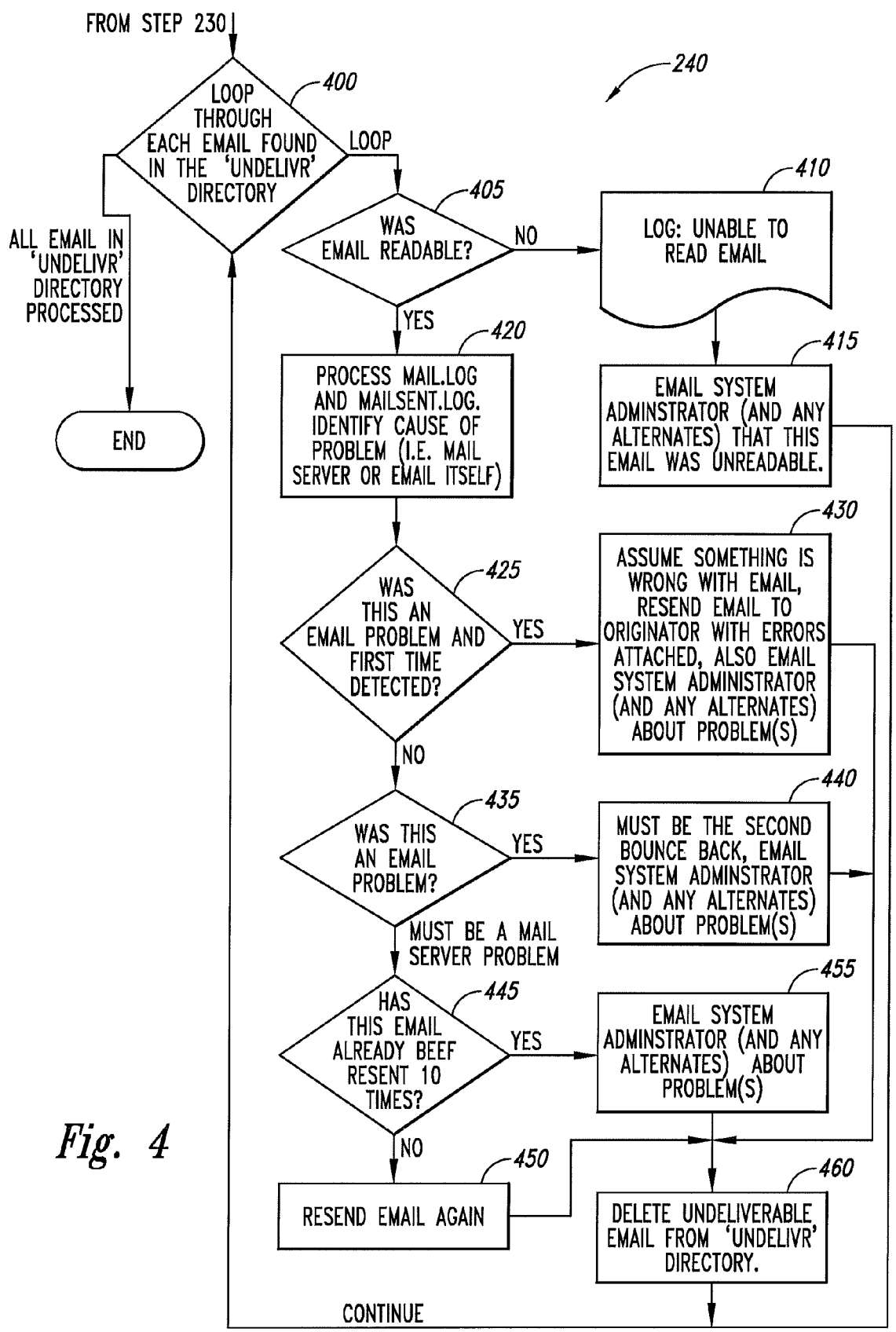
FIG. 4 is a flowchart for the processing of undelivered emails act shown in FIG. 2.

Referring now to FIG. 4, a flowchart for an exemplary processing of the undeliverable emails returned to server 110 is shown. All these undeliverable emails may be sequentially processed starting at step 400, which determines whether any emails remain unprocessed. If email remains unprocessed, the first remaining unprocessed email may be examined in step 405 to determine whether it is readable by server 110. If the undeliverable email being processed is unrecognizable by server 110, the inability to read it is logged at step 410 and then system administrator 106 emailed regarding this problem at step 415. Should the undeliverable email being processed be readable by server 110, there can be two reasons for its undeliverability: either the email itself is faulty or the problem lies with mail server 120. Should the problem lie with the email, there is no reason to resend it because it will simply be returned again. If instead the problem lies with mail server 120, the email may be resent since the email itself is sound.

Accordingly, the intelligent email service determines the cause of the problem by examining the error message returned with the undeliverable email in step 420. Based upon this examination, whether this was a first-time-detected problem with the undeliverable email itself is determined at step 425. If yes, the faulty email is resent to the Originator with the errors attached at step 430 and system administrator 106 notified of the problem by an email. If no, whether there is a problem with the email itself is determined at step 435. If yes, it may be assumed that the email has been returned at least twice so that resending it would be futile. Thus, just an email notifying system administrator 106 about the problem is sent at step 440.

As discussed above, an undeliverable email may be resent if the problem lies with mail server 120. However, after a certain number of tries has been exceeded, this resending effort may be considered futile. Thus, should the determination at step 435 indicate that the faulty condition lies with mail server 120, whether the undeliverable email has been resent more than, for example, 10 times is determined in step 445. If no, the undeliverable email may be resent to the intended recipient at step 450. If yes, system administrator 106 may be emailed about the problem without any further resending of the undeliverable email at step 455. A readable, undeliverable email will thus be processed undeliverable through steps 430, 440, 450, and 455 as determined by its error condition. Regardless of its error condition, the undeliverable email may then be deleted from the undeliverable directory or folder at step 460. Once all the undeliverable email has been processed, the processing may stop.

It will be appreciated that the present invention may be broadly applied to any web server that provides a rudimentary email capability with respect to automatically-generated emails. Accordingly, although the invention has been described with respect to particular embodiments, this description is only an example of the invention's application and should not be taken as a limitation. Consequently, the scope of the invention is set forth in the following claims.

I claim:

1. An email method for an intranet web server, the email method comprising:
 at the intranet web server, automatically generating email on behalf of an intranet user;
 at the intranet web server, queuing the automatically-generated email in an email spooler;
 at the intranet web server, sending the automatically-generated email to a mail server for delivery to an intended recipient via the Internet, the mail server interposed between the intranet web server and the Internet; and
 at the intranet web server, if the automatically-generated email is returned from the mail server as undeliverable to the intended recipient the email method includes the acts of:
 (a) fetching an email address for the intranet web server's system administrator;
 (b) verifying normal operation of the email spooler by examining each email queued in the email spooler to determine the pendency of each email within the email spooler;

(c) emailing the system administrator regarding an abnormal operation if act (b) verifies that the email spooler is not operating normally;
(d) processing each undeliverable email to determine whether it was returned because of a problem with the email itself or because of a problem with the mail server;
(e) resending the undeliverable email to the intended recipient if act (d) determines that an undeliverable email was returned because of a problem with the mail server; and
(f) sending the undeliverable email to the originating intranet user if act (d) determines that an undeliverable email was returned because of a problem with the undeliverable email itself,
wherein act (b) comprises:
emailing the system administrator regarding each email's pendency if an email's pendency within the email spooler exceeds a normal pendency period from a time initially received by the email spooler,
wherein the normal pendency period comprises a predefined time period including two minutes from the time initially received by the email spooler.

2. The method of claim 1, wherein act (a) comprises fetching the email address from a database.

3. The method of claim 1, wherein acts (a) through (f) are repeated periodically.

4. The method of claim 3, wherein acts (a) through (f) are repeated at least every 30 minutes.

5. The method of claim 1, wherein acts (a) through (f) are repeated periodically, and wherein act (b) further comprises:
deleting this email from the email spooler and emailing the system administrator that a persistent email spooler problem has been detected if an email has been previously detected as exceeding the normal pendency period.

6. The method of claim 5, wherein act (b) further comprises:
restarting the email spooler if an email has been previously detected as exceeding the normal pendency period.

7. The method of claim 1, wherein acts (a) through (f) are repeated periodically, and wherein act (e) comprises resending the undeliverable email to the intended recipient only if it has not been previously resent to the intended recipient a predetermined number of times.

* * * * *